United States Patent [19]

Suyama et al.

[11] Patent Number: 4,763,269
[45] Date of Patent: Aug. 9, 1988

[54] POSITION DETERMINING APPARATUS FOR VEHICLE

[75] Inventors: Michiyo Suyama; Yasuyuki Akama, both of Himeji, Japan

[73] Assignee: Mitsubishi Denki Kabushiki Kaisha, Japan

[21] Appl. No.: 847,527

[22] Filed: Apr. 3, 1986

[30] Foreign Application Priority Data

Apr. 5, 1985 [JP] Japan .................................. 60-72943

[51] Int. Cl.$^4$ ........................ G01C 21/00; G06F 15/50
[52] U.S. Cl. .................................... 364/449; 340/988; 364/444
[58] Field of Search ............ 364/443, 444, 449, 460, 364/521; 340/988, 990, 995; 73/178 R; 342/450-452

[56] References Cited

U.S. PATENT DOCUMENTS

| | | | |
|---|---|---|---|
| 4,563,685 | 1/1986 | Matsumoto et al. | 364/444 |
| 4,608,656 | 8/1986 | Tanaka et al. | 364/443 |
| 4,642,776 | 2/1987 | Matsumoto et al. | 364/444 |

FOREIGN PATENT DOCUMENTS

| | | | |
|---|---|---|---|
| 58-30616 | 2/1983 | Japan | 364/449 |
| 58-204310 | 11/1983 | Japan | 364/449 |

OTHER PUBLICATIONS

SAE Technical Paper Series #840313, Cathode-Ray Tube Information . . . , Jarvis et al, pp. 123-143.
SAE Technical Paper Series #840485, On-Board Computer System for Navigation . . . , Haeussermann.

*Primary Examiner*—Gary Chin
*Attorney, Agent, or Firm*—Leydig, Voit & Mayer

[57] ABSTRACT

A position determining apparatus for a vehicle in which movement components in longitudinal (southerly-northerly) and latitudinal (easterly-westerly) directions in a unit running distance of the vehicle are determined from an initialized location. The apparatus determines the longitudinal distance of the current position of the vehicle from the initialized location by integrating the movement component in the longitudinal direction and utilizes the longitudinal distance for determining a latitude difference from a reference latitude and a virtual latitude. The apparatus converts the movement component in the latitudinal direction at the virtual latitude into a latitudinal movement component at the reference latitude to determine the latitudinal distance of the current position of the vehicle from the initialized location. The latitudinal and longitudinal distances of the current position of the vehicle are displayed.

2 Claims, 4 Drawing Sheets

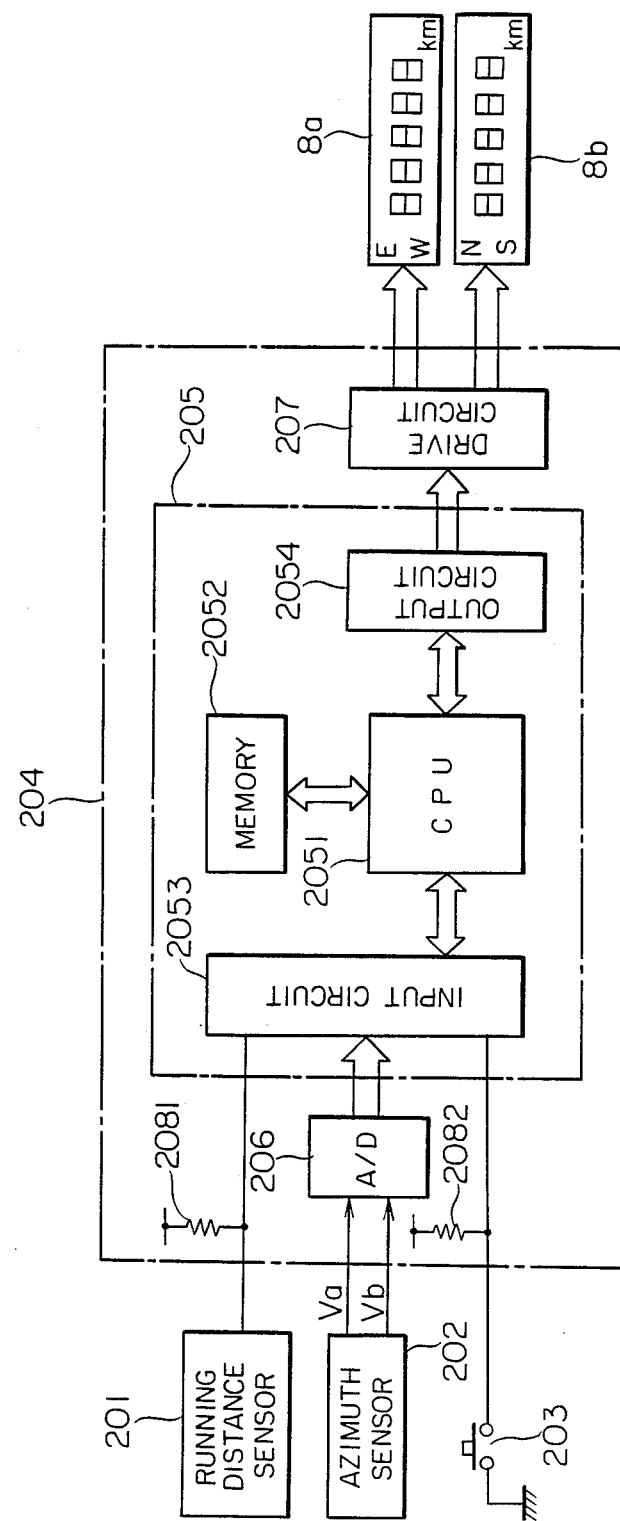

POSITION DETERMINING APPARATUS FOR VEHICLE

BACKGROUND OF THE INVENTION

This invention relates to a position determining apparatus for a vehicle in which the geographical position of the vehicle is calculatively found from the measured heading and running distance of the vehicle.

Prior art of this type is described in Japanese Patent Application Laid-open No. 54-121767 by way of example. According to this document, an angle (traveling direction angle) $\theta$, which is defined between the southerly-northerly direction and the traveling direction of a vehicle in a predetermined small running distance is determined so as to obtain, sin $\theta$ and cos $\theta$. These sine and cosine values are then multiplied by a proportion constant K which corresponds to the product of the predetermined small running distance and a preset scale ratio. Such multiplied values are cumulated from a reference (starting) point on the map at every predetermined small running distance to determine the geographical position of the vehicle. Those cumulative values K $\Sigma$ sin $\theta$ and K $\Sigma$ cos $\theta$ represent the calculated instant position of the vehicle after every predetermined small running distance. For a small traveling area, this calculated position differs little from the actual position of the vehicle as determined by its geographical positions relative to the earth. For a large traveling area, this difference may become substantial. FIG. 1 shows a diagram for elucidating this situation. In the figure, the coordinates (longitudes, latitudes) of locations A, B, C and D are (100°, 35°), (90°, 35°), (90°, 45°) and (100°, 45°) respectively, and the distances between the respectively adjacent locations are as follows:

Between $A$ and $B$ ... $2 \pi R$ (cos 35°) $\frac{10°}{360°} \cong 910$ (km)

Between $B$ and $C$ ... $2 \pi R \frac{10°}{360°} \cong 1111$ (km)

Between $C$ and $D$ ... $2 \pi R$ (cos 45°) $\frac{10°}{360°} \cong 786$ (km)

Between $D$ and $A$ ... $2 \pi R \frac{10°}{360°} \cong 1111$ (km)

where, the distances between the locations A and B and between those C and D respectively indicate the lengths of circumferential arcs measured along the latitudinal parallels passing through the respective locations while the distances between the locations B and C and between D and A respectively indicate the lengths of circumferential arc measured along the longitudinal meridians passing through the respective locations. In addition, it is here assumed that letter R indicates the mean value of the equatorial radius and polar radius of the earth, which is 6367.6 km.

Now, let's consider the case where the point A is a starting location (set as the origin) and where a vehicle travels along the respective longitudinal meridians and latitudinal parallels to points B, C and D, and back to A again. In this case, the cumulative value in the longitudinal direction becomes null since the distances BC and DA are equal to each other. Regarding the cumulative value in the easterly-westerly direction, i.e. the latitudinal direction, however, the distances AB and CD are unequal having the difference of 124 km (910-786) therebetween.

As a result, when the vehicle returns to the starting location A, the calculated position of the vehicle is different from the position of the starting location A. In other words, the vehicle now has a different coordinate reading even though it is physically at the same starting location A.

On the other hand, different approaches to the determination of vehicle position have also been proposed, such as in, "Cathode-Ray Tube Information Center with Automotive Navigation" published in SAE TEchnical Paper Series 840485 by M. W. Jarvis and R. C. Berry, and in "On-Board Computer System for Navigation, Orientation, and Route Optimization" published in SAE Technical Paper Series 840313 by P. Haeussermann. Both publications are based on an international Congress & Exposition held in Detroit, Mich. on Feb. 27–Mar. 2, 1984. In the first document, an approximate position of a vehicle is determined from the communication with a satellite, and a more accurate position is determined and displayed on the CRT by means of a self-contained navigation using an earth magnetism sensor in the vehicle. The second document discloses a composite system of a route guide system in trunk (main) highways using distance information and a destination indicating system within a city using distance information and heading information. While these systems alleviate some problems inherent in prior art systems, they still do not provide accurate vehicle positioning necessary for an effective automotive navigating system.

SUMMARY OF THE INVENTION

This invention has the objective of overcoming the problem described above, and has for its main object to provide a position determining apparatus for a vehicle which can reduce cumulative value errors at the return of the vehicle to a starting location even when the vehicle travels over the boundary of large area.

The position determining apparatus for a vehicle according to this invention comprises a movement component calculation means for determining a latitudinal movement component and a longitudinal movement component of the vehicle per unit running distance from a running distance and a traveling azimuth of the vehicle, a longitudinal distance calculation means for integrating the longitudinal movement components thereby to determine a longitudinal distance taken from an initialized location, a virtual latitude calculation means for determining a latitude difference between the initialized location and the current position of the vehicle from the longitudinal distance and for adding the latitude difference to a reference latitude thereby to determine a virtual latitude of the current position of the vehicle, and a latitudinal distance calculation means for converting the latitudinal movement component per unit running distance into a latitudinal movement component at the reference latitude by the use of the virtual latitude and the reference latitude and for integrating the latter component to determine a latitudinal distance taken from the initialized location.

The position determining apparatus for a vehicle in this invention determined movement components in longitudinal and latitudinal directions in a unit running distance of the vehicle, integrates the movement components in the longitudinal direction thereby to obtain a longitudinal distance of the vehicle, determines a virtual latitude from the distance and a reference latitude, and converts the latitudinal movement component into a latitudinal movement component at the reference latitude on the basis of the virtual latitude and the reference latitude, and determines the latitudinal distance of the vehicle by integrating the latitudinal movement components at the reference latitude.

BRIEF DESCRIPTION OF THE DRAWINGS

FIG. 3 is a block diagram of the hardware of a position determining apparatus for a vehicle according to this invention;

DETAILED DESCRIPTION OF THE PREFERRED EMBODIMENT

Figure 2:
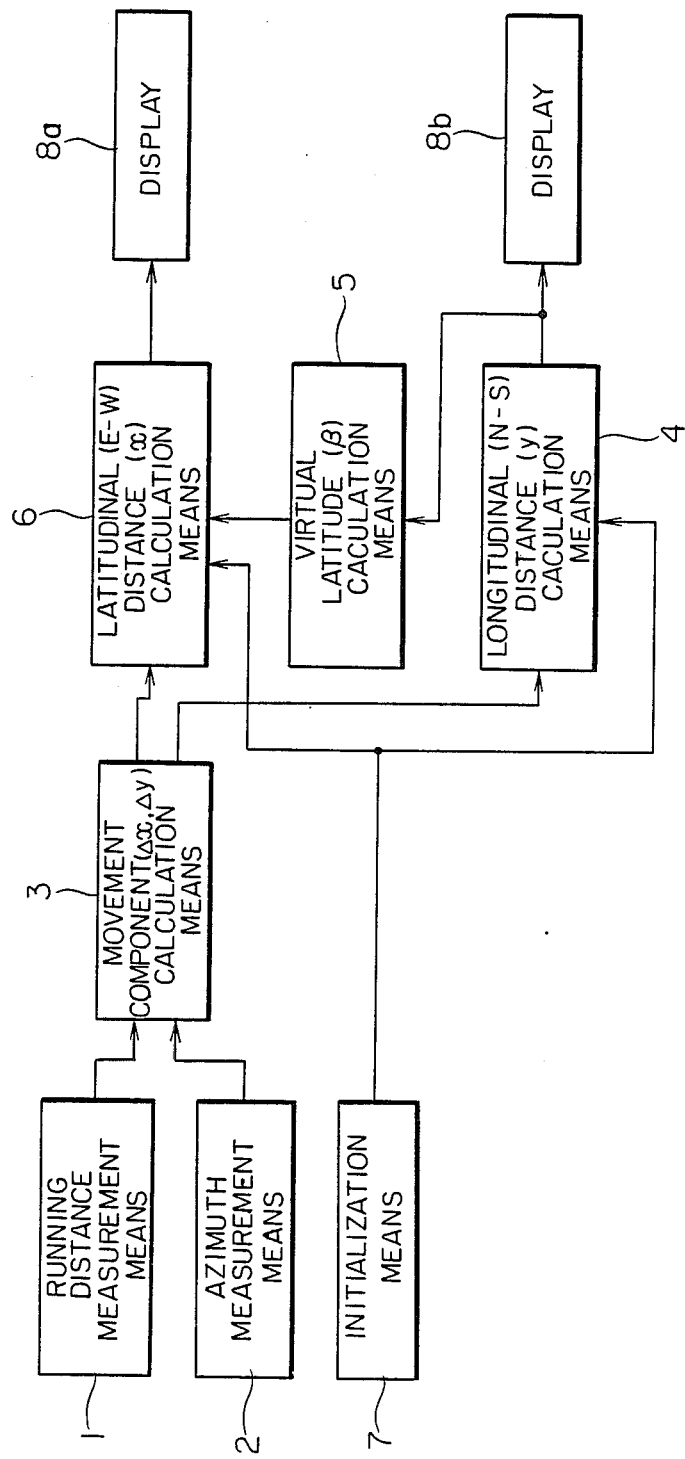
FIG. 2 is a functional block diagram of a position determining apparatus for a vehicle showing one embodiment of this invention.

Now, one embodiment of this invention will be described with reference to the drawings. Referring to FIG. 2 showing a position determining apparatus for a vehicle according to this invention, this apparatus comprises a running distance detection means 1 for measuring the running distance of the vehicle, an azimuth (heading) detection means 2 for detecting the heading of the vehicle, a movement component calculation means 3 for determining a latitudinal movement component and a longitudinal movement component per unit running distance of the vehicle from the running distance and the heading provided by both the detection means 1 and 2, a longitudinal distance calculation means 4 for integrating the longitudinal movement components provided by the calculation means 3 thereby to determine a longitudinal distance taken from a settable initialized location, and a virtual latitude calculation means 5 for determining a latitude difference between the initialized location and the current position of the vehicle from the longitudinal distance of the vehicle provided by the longitudinal distance calculation means 4 and for adding the latitude difference to a preset reference latitude thereby to determine the virtual latitude of the current position of the vehicle. This apparatus further comprises a latitudinal distance calculation means 6 for converting the latitudinal movement component provided by the movement component calculation means 3 into a latitudinal movement component at the reference latitude by the use of the reference latitude and the virtual latitude provided by the virtual latitude calculation means 5 and for integrating the converting values thereby to determine a latitudinal distance taken from the initialized location, and an initialization means 7 for setting the initial values of the latitudinal distance and the longitudinal distance of the corresponding calculation means at the initialized location. Symbol 8a denotes a display unit which displays the latitudinal distance of the vehicle provided by the latitudinal distance calculation means 6 while symbol 8b denotes a display unit which displays the longitudinal distance of the vehicle provided by the longitudinal distance calculation means 4.

Figure 4:
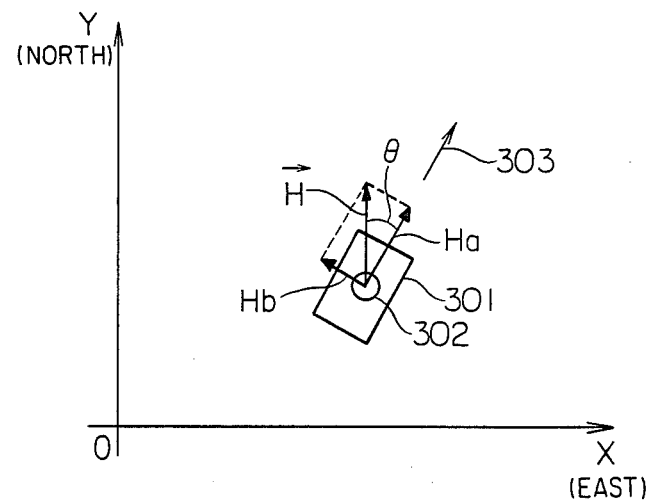
FIG. 4 is a diagram for explaining an azimuth sensor.

FIG. 3 is a block diagram showing a hardware arrangement to be utilized in the apparatus shown in FIG. 2. As shown, the apparatus includes a running distance sensor 201, an azimuth sensor 202, a start switch 203, a control circuit 204, and the display units 8a and 8b. The running distance sensor 201 detects the rotation of a vehicle wheel by means of an electromagnetic pickup, a read switch or the like, and outputs a pulse signal having a frequency proportional to the rotational number (RPM) of the vehicle wheel. As illustrated in FIG. 4 by way of example, the azimuth sensor 202 detects a terrestrial magnetism $\vec{H}$ decomposed into a component Ha representing the heading of the vehicle 301 and a component Hb perpendicular to the component Ha by means of a flux gate type terrestrial magnetism detector 302 or the like fixed to the vehicle 301, and output D.C. voltage signals Va and Vb proportional to the respective components. The control circuit 204 includes a microcomputer 205 which has a CPU 2051, a memory 2052, an input circuit 2053, and an output circuit 2054; an A/D converter 206 which converts the outputs Va and Vb of the azimuth sensor 202 into digital values; a drive circuit 207 by which the display units 8a and 8b formed of fluorescent display tubes or the like are caused to display data from the microcomputer 205; and resistors 2081 and 2082 for interfaces. The outputs of the running distance sensor 201 and the start switch 203 are applied to the input circuit 2053 of the microcomputer 205, and the outputs of the azimuth sensor 202 are applied to the A/D converter 206, the output of which is applied to the input circuit 2053 of the microcomputer 205. Besides, the display data prepared by the microcomputer 205 is given from the output circuit 2054 to the drive circuit 207, the output of which is applied to the display units 8a and 8b.

Figure 5A:
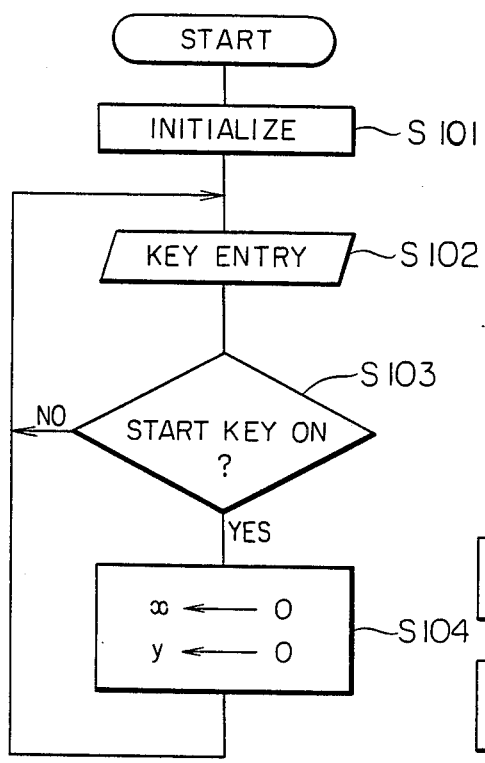
FIGS. 5A and 5B are flow charts of programs which are stored in the memory of a microcomputer shown in FIG. 3.

Next, the operation of the embodiment will be described with reference to FIGS. 5A and 5B which show flow charts of programs stored in the memory 2052 of the microcomputer 205. FIG. 5A shows the flow chart of a main routine. When the control circuit 204 is energized, the main routine starts. After the variables have been initialized at step S101, steps S102 and S103 are repeatedly executed. When an operator depresses the start switch 203, the depression is detected at step S103. Then, at Step S104, the values of an integrating memory area $\underline{x}$ indicative of the latitudinal (easterly-westerly) distance of the vehicle and a memory area $\underline{y}$ for the longitudinal (southerly-northerly) distance thereof are cleared to zero, whereby the operations of integrating or adding up the distances are initialized so as to presume a geographical location (hereinafter referred to as "initialized location") where the start switch 203 is depressed, as the origin.

Figure 5B:
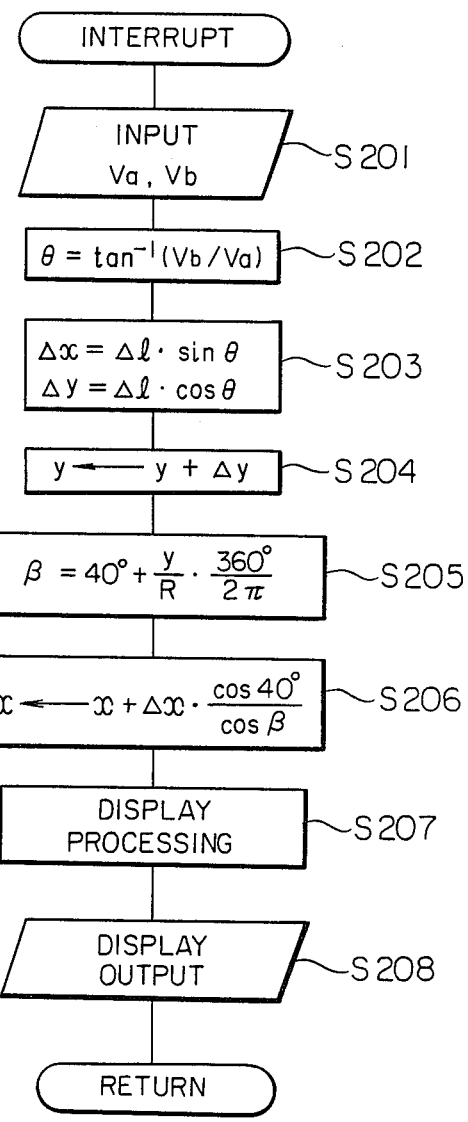

When the vehicle is being run, an interrupt signal is input to the microcomputer 205 at every unit running distance $\Delta l$ (for example, 3 m) on the basis of the pulse signal produced by the running distance sensor 201, thereby executing an interrupt processing routine the flow chart of which is shown in FIG. 5B. Firstly, signals Va and Vb from the azimuth sensor 202 are input at step S201, and an angle $\theta$ defined between the terrestrial magnetism $\vec{H}$ and the heading 303 of the vehicle 301 as illustrated in FIG. 4 is computed according to the following equation at step S202:

$$\theta = \tan^{-1}(Vb/Va)$$

Next, Step S203 computes the latitudinal (easterly-westerly) movement component $\Delta x$ and longitudinal (southerly-northerly) moving component $\Delta y$ of the unit running distance $\Delta l$ in accordance with the following equations:

$$\Delta x = \Delta l \cdot \sin \theta$$

$$\Delta y = \Delta l \cdot \cos \theta$$

Figure 1:
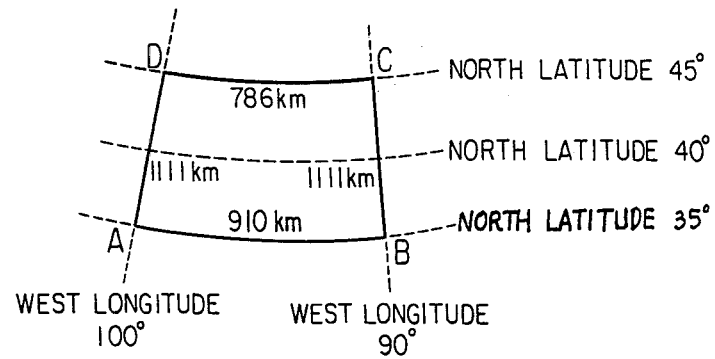
FIG. 1 is a diagram showing an exemplified zone in which a vehicle travels.

Step S204 computes a southerly-northerly distance y, from the initially set point, obtained by integrating the southerly-northerly movement component $\Delta y$, and step S205 computes the latitude difference $(y/R) \cdot (360°/2\pi)$ between the origin and the current position of the vehicle from the longitudinal (southerly-northerly) distance y obtained at step S204, and computes a value $\beta$ (hereinafter referred to as "virtual latitude") obtained by the addition of the aforementioned latitude difference to a reference latitude (which, in the example of FIG. 1, is started as the middle latitude of 40° between 35° and 45° of the north latitude), that is, $$\beta = 40° + \frac{y}{R} \cdot \frac{360°}{2\pi}$$

At the next step S206, the (easterly-westerly) movement component $\Delta x$ determined at step S203 is converted into a latitudinal (easterly-westerly) movement component $\Delta x \cdot (\cos 40°/\cos \beta)$ at the reference latitude 40° by the use of the ratio of $\cos 40°/\cos \beta$ (hereinafter referred to as "conversion ratio") between the respective cosines of the virtual latitude $\beta$ obtained above and the reference latitude 40°, and the converted values are integrated or added up to compute the latitudinal (easterly-westerly) distance x taken from the origin. It is to be noted that, the conversion rtio signifies the ratio between the circumferential length $2\pi R \cos 40°$ of the latitudinal parallel at the reference latitude 40° and the circumferential length $2\pi R \cos \beta$ of the latitudinal parallel at the virtual latitude $\beta$.

Figure 6:
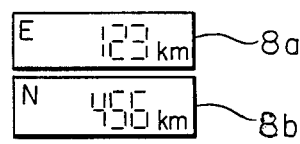
FIG. 6 is a front view of a display unit.

Subsequently, step S207 performs the processing of converting the distances x and y respectively in the latitudinal (easterly-westerly) direction and the longitudinal (southerly-northerly) direction into data for display, and at step S208 the data is output to the drive circuit 207. The drive circuit 207 drives the display units 8a and 8b so as to display the data items, and for example, $x = 123$ (km) and $y = 456$ (km) are indicated in a display form as shown in FIG. 6.

In this invention constructed as thus far described, assuming by way of example that the start switch 203 is operated at the location A in FIG. 1 and that the vehicle travels in the order of the locations A, B, C, D and A along the latitudinal parallels and the longitudinal meridians, the values x and y at the time of return of the vehicle to the location A are:

$$x = -27 \text{ (km)}$$

$$y = 0 \text{ (km)}$$

As compared with the error 124 km of the latitudinal (easterly-westerly) distance in the prior art, the error 27 km mentioned above is much smaller. Further, assuming that the location C is the initialized location and that the vehicle travels in the order of the locations C, D, A, B and C, the values x and y at the time of return of the vehicle to the location C are:

$$x = 19 \text{ (km)}$$

$$y = 0 \text{ (km)}$$

Assuming the case where the vehicle has started from any location at the reference latitude 40°, the error attributed to the fact that the circumferential lengths of latitudinal parallels differ depending upon the latitude becomes null. In this manner, when the reference latitude is preset at a proper one passing within a runnable region determined beforehand (by, for example, the national boundary), the error of the integrated value x can be made small whatever location within the region may be chosen as the initialized location (starting point).

In the embodiment, the middle value of the southern and northern ends of the running region has been used as the reference latitude. With this measure, however, the conversion ratios of the latitudinal (easterly-westerly) movement component differ between the case where the vehicle starts from the southern end (e.g., the point A) and the case where it starts from the northern end (e.g., point C), so that an error is developed as stated before. A reference latitude $\beta_0$ for equalizing such an error is obtained from the following equation of the condition that the ratios of the respective circumferential lengths of adjacent latitudinal parallels are equal:

$$\frac{2\pi R \cos 45°}{2\pi R \cos \beta_0} = \frac{2\pi R \cos \beta_0}{2\pi R \cos 35°}$$

and therefore it may be set to 40.4°. In addition, if an actuator is separately disposed so as to permit the operator to set the reference latitude at will, accurate positional calculations are always ensured by setting a starting location, as frequently used, at the reference latitude.

As described above, according to this invention, movement components in the latitudinal (easterly-westerly) direction and in the longitudinal (southerly-northerly) direction are determined in a unit running distance of a vehicle, a virtual latitude of the vehicle is determined from a reference latitude and the longitudinal (southerly-northerly) distance of the vehicle obtained by integrating the movement components in the longitudinal (southerly-northerly) direction, the latitudinal (easterly-westerly) movement component is converted into a latitudinal (easterly-westerly) movement component at the reference latitude on the basis of the virtual latitude and the reference latitude, and the latitudinal (easterly-westerly) distance of the vehicle is determined by integrating the movement components at the reference latitude. The invention therefore brings forth the effect that the error of a cumulative value can be reduced in the case where the vehicle returns to a starting point after having traveled along the boundary of a large area.

What is claimed is:

1. A position determining and indicating apparatus for a vehicle comprising:
    a running distance detecting means for detecting a running distance of the vehicle based upon rotation of a vehicle wheel detected by a distance sensor producing an output, a vehicle heading detecting means for detecting a heading of the vehicle based upon direction of travel of the vehicle detected by an azimuth sensor producing an output, a movement component calculation means for determining first latitudinal movement components and first longitudinal movement components per unit running distance of the vehicle from the running distance and the heading provided by the outputs of both of said distance sensor and said azimuth sensor, a longitudinal distance calculation means for integrating the first longitudinal movement components per unit running distance provided by said movement component calculation means to determine a longitudinal distance taken from an initial location, a virtual latitude calculation means for determining a latitude difference between the initial location and a current position of the vehicle from the longitudinal distance of the vehicle provided by said longitudinal distance calculation means and for adding the latitude difference to a preset reference latitude to determine a virtual latitude of the current position of the vehicle, a latitudinal distance calculation means for determining second latitudinal movement components per unit running distance of the vehicle at the reference latitude by the use of the reference latitude and the virtual latitude provided by said virtual latitude calculation means on the basis of the first latitudinal movement components and for integrating the second latitudinal movement components to determine a latitudinal distance taken from the initial location, an initialization means for setting initial values of the latitudinal distance and the longitudinal distance in said distance calculation means at the initial location; and means for indicating the current position of the vehicle on the basis of the latitudinal and longitudinal distances determined by said latitudinal and longitudinal distance calculating means.

2. A position determining and indicating apparatus for a vehicle according to claim 1 wherein said indicating means comprises display means to display the latitudinal and longitudinal distances of the current position of the vehicle from the initialized location.

* * * * *